United States Patent [19]

Carson

[11] 4,251,029

[45] Feb. 17, 1981

[54] UNDERGROUND SERVICE MODULE

[75] Inventor: Miles T. Carson, 2390 W. Dartmouth at S. Zuni, Englewood, Colo. 80110

[73] Assignee: Miles T. Carson, Englewood, Colo.

[21] Appl. No.: 968,790

[22] Filed: Dec. 12, 1978

[51] Int. Cl.[3] .............................................. B60H 1/04

[52] U.S. Cl. ...................................... 237/12.1; 165/47; 165/51; 165/DIG. 12

[58] Field of Search .................... 165/41, DIG. 12, 42, 165/43, 51, 47; 98/39; 237/12.1; 60/727; 122/26; 126/247; 417/539

[56] References Cited

U.S. PATENT DOCUMENTS

| | | | |
|---|---|---|---|
| 979,579 | 12/1910 | Shuman | 122/26 |
| 3,610,524 | 10/1971 | Wallen | 237/12.1 |
| 3,672,445 | 6/1972 | Carson | 165/42 |
| 3,799,244 | 3/1974 | Strauss et al. | 165/42 X |
| 3,937,034 | 2/1976 | Eskeli | 126/247 X |
| 3,964,458 | 6/1976 | Strauss et al. | 165/41 X |

*Primary Examiner*—Albert W. Davis
*Assistant Examiner*—Margaret A. Focarino
*Attorney, Agent, or Firm*—Kerkam, Stowell, Kondracki & Clarke

[57] ABSTRACT

A self-contained service module incorporates a water cooled internal combustion engine as a primary power source which drives a low-pressure, high-volume forced air ventilation system; a water-cooled, high-pressure air compressor; and an alternator. Large diameter steel tubing is utilized as a basic framework for the system and provides a dual function by supporting the primary components of the system and by serving as a reservoir for the high-pressure air. A heat exchange radiator is provided to remove heat from the engine and air compressor cooling liquid and heat the low-pressure air in the ventilation system. When heated air is not required, the radiator is moved to a second position so that air passing therethrough is exhausted from the unit and fresh air at ambient temperatures is provided by the ventilation system.

11 Claims, 6 Drawing Figures

UNDERGROUND SERVICE MODULE

THE INVENTION

This invention relates to a module for servicing closed working areas such as manholes by providing heated ventilating air for the workmen and compressed air and electrical power for operating tools.

BACKGROUND OF THE INVENTION

In our urban society a majority of utilities are routed via underground conduits. Access to the conduits is provided at key locations by way of manholes whereby workmen may descend into the conduits and repair or add utility facilities. This work is normally time consuming and the workmen must remain in the underground conduits for extended periods of time. The conduits are not ventilated and therefore noxious and poisonous gases may accumulate therein and create an atmosphere which is hazardous to their health. Therefore, it has been a practice to provide ventilating air to a manhole by way of a small, portable, engine driven squirrel cage type fan. These fans are usually carried by service trucks when not in use and deployed by placing them on the ground adjacent to the manhole being serviced. This results in the fan scavenging noxious gases from the surface, such as exhaust fumes from the engine driving the fan, and forcing them into the area being serviced where they contribute to the unhealthy atmosphere rather than improve it. Furthermore, this air can be extremely cold in the winter and hamper the servicemen. This is overcome by attaching a propane heater to the blower fan housing. This provides heated air but it creates logistics problems in setting up the bulky heating equipment and fuel source near the manhole in an area which may be a crowded city street.

Servicemen working in underground conduits require compressed air and electricity to drive their tools and provide a means to illuminate the work area. This is usually supplied by an air compressor and electrical generator, both of which are positioned on the surface near the manhole. This results in a large amount of equipment deployed about a manhole and creates significant traffic disruptions. Furthermore, the time required to deploy the various components required to service workmen in a manhole greatly increases the cost for accomplishing a predetermined job in a conduit.

These drawbacks have been partially overcome by systems such as that disclosed in U.S. Pat. No. 3,672,445 issued to T. Carson on July 27, 1972. This patent discloses a truck mounted system which utilizes the prime mover driven generator to provide electric power for an electrically driven air compressor and high-volume low-pressure air ventilation system. The Carson system also includes a heat exchanger wherein hot water from the truck engine heats the ventilating air supplied via the low-pressure, high-volume portion of the system.

Truck mounted systems such as Carson 3,672,445 must be permanently installed in the vehicle due to the water and electrical interconnections between the system and the vehicle engine. Therefore a truck must be designated as a manhole service truck and this results in a significant capital expenditure for each manhole support service system. Operation of the system is also uneconomical because it requires that the engine of the truck be run constantly while the service module is in operation. This is costly not only in fuel consumed but also in the useful life of the truck engine since it is being operated in an environment for which it was not originally designed.

OBJECTIVES OF THE INVENTION

In view of the preceding, it is a primary objective of the present invention to provide a self-contained service module which includes a water cooled internal combustion engine adapted to drive a water cooled air compressor, a ventilation fan, and an alternator.

A further objective of the present invention is to provide a means whereby ventilation air may be heated by the waste heat of the internal combustion engine and air compressor of a self-contained underground service module.

A still further objective of the present invention is to provide a means whereby the radiator of a self-contained underground service module may be positioned in or out of the ventilation air supply system as required by environmental conditions.

Another objective of the present invention is to provide a self-contained underground service module which is light in weight and may be transported by a variety of vehicles, off loaded by hand and positioned near a manhole being serviced to free the transportation vehicle for other duty.

It is another objective of the present invention to provide a dual purpose framework for a service module which supports the components thereof and serves as a high-pressure air storage container.

A still further objective of the present invention is to provide a heat exchange radiator for extracting heat from the cooling fluids utilized by an internal combustion engine and air compressor of a service module which may be positioned in the ventilating air plenum when heated ventilated air is required or positioned outside of the ventilating air plenum when heated ventilating air is not required.

A still further objective of the present invention is to provide a liquid cooled muffler and an exhaust gas heat exchanger for the internal combustion of a service module whereby heat extracted from the exhaust gases of the internal combustion engine may be utilized to heat ventilating air supplied by the system.

SUMMARY OF THE INVENTION

The present invention comprises an underground service module which is self-contained and may be transported in a variety of vehicles to a work site where it will provide conditioned air to an underground utilities conduit and compressed air and electrical power for tools, service equipment and illumination means. The module includes a water cooled internal combustion engine which drives an alternator and water cooled air compressor by way of belt drives. The three primary components, internal combustion engine, air compressor and alternator are supported on a framework fabricated from steel tubing which functions as a compressed air reservoir.

The low-pressure conditioned air for ventilating underground conduits being serviced is generated by a blower encased in a voluted plenum constructed so that the pressure within the plenum is greater than the ambient environmental pressure to prevent exhaust fumes or objectionable gases from entering the supply of conditioned air. The plenum is split, with one portion channeling conditioned air to the service area and the other portion exhausting surplus air from the bottom of the module. The heat exchanger for extracting heat from the cooling fluid of the internal combustion engine and air compressor is positioned so that it may be placed in the plenum so that the air going to the service area must pass therethrough whereby it is heated or if it is not desirable to heat the ventilating air, the heat exchanger may be moved to an alternate position wherein the surplus air exiting the module passes through the heat exchanger to extract heat from the cooling fluid therein without adding to the heat of the conditioned air provided to the service area.

The high-pressure air and electric power generated by the system is coupled to the service area by way of high-pressure hoses and electrical cables which are stored on reels driven by an electric motor to overcome prior art storage means which utilize spring biased reels that have a tendency to wind up the cables and hoses when it is wished that they be deployed.

DESCRIPTION OF THE INVENTION

Figure 1:
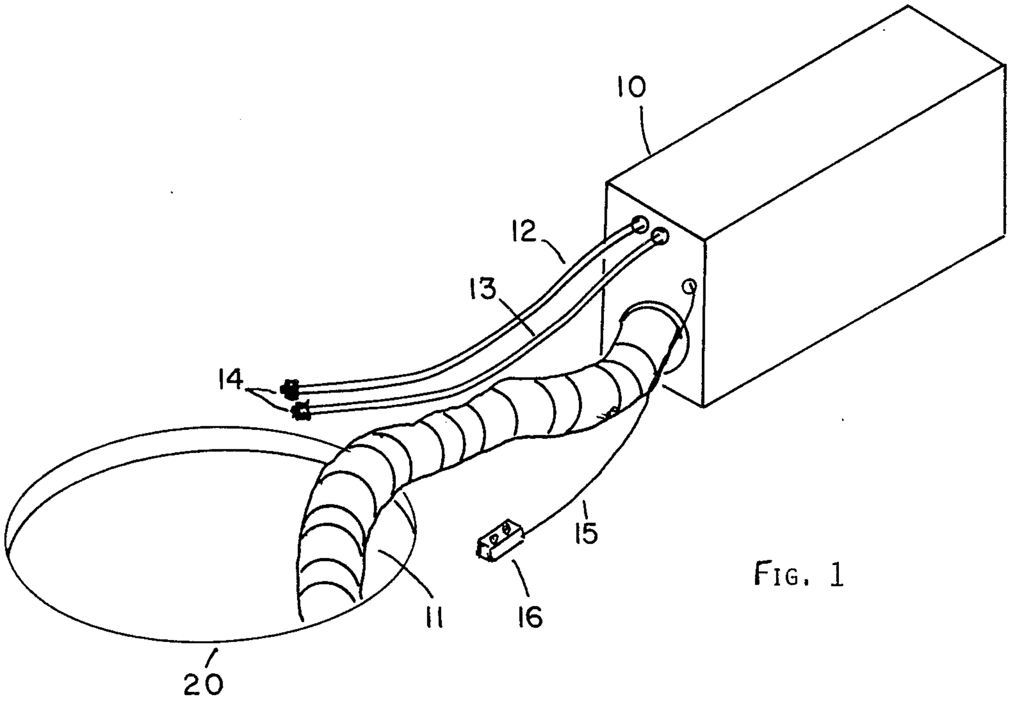
FIG. 1 is a perspective view showing the underground service module with its conditioned air cônduit, high-pressure hoses, and electrical extension cable entering an underground utilities conduit via a manhole.

FIG. 1 illustrates the underground service module 10 deployed along side a manhole 20. Conditioned ventilating air is supplied to the area serviced by the manhole by a collapsible duct 11. High-pressure air from the air compressor is made available at the work area by high-pressure air hoses 12 and 13 which are terminated by quick release fittings 14. Electrical current provided by the alternator of the service module is provided on electrical extension 15 which is terminated by a multi-outlet receptacle 16.

Figure 2:
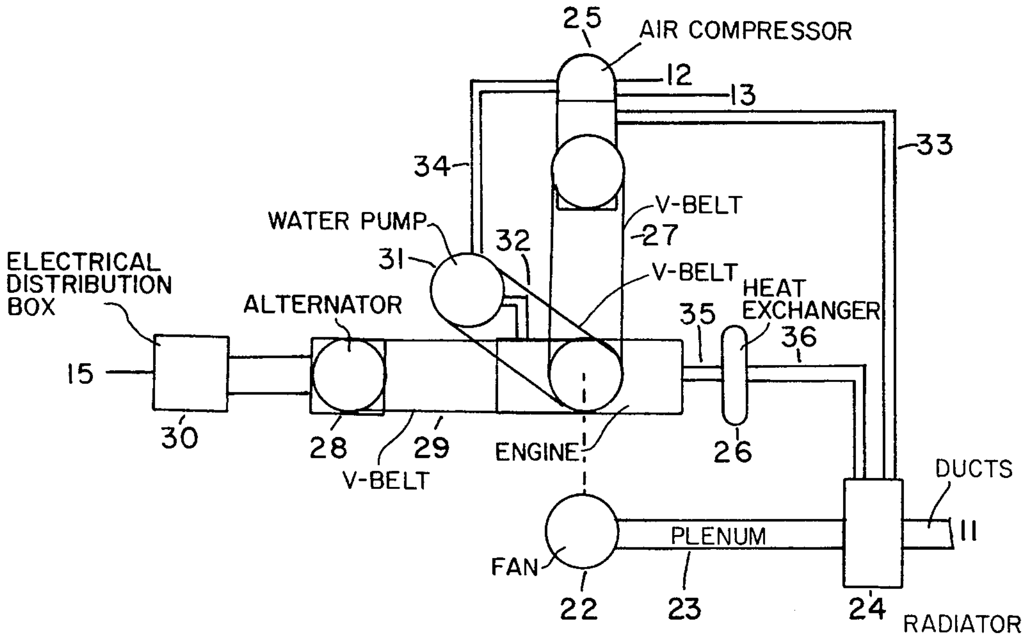
FIG. 2 is a diagram illustrating the functional interrelationship between the internal combustion engine, alternator, air compressor, ventilating fan, and heat exchanger.

The ventilating air, high-pressure air and electrical power provided to manhole 20 of FIG. 1 is produced by the elements shown schematically in FIG. 2. The internal combustion engine 21 is coupled directly to a fan 22 that forces a high volume of air via plenum 23 into duct 11. This air may be heated by radiator 24 which is incorporated in the liquid cooling circuit for internal combustion engine 21 and air compressor 25. Additional heat is provided to the radiator 24 in the form of cooling fluid from heat exchanger 26 which extracts heat from the exhaust gases of the internal combustion engine. When it is not desirable to heat the ventilating air supplied to the manhole, radiator 24 is positioned so that the ventilating air will not pass therethrough on its way to conduit 11.

In addition to driving fan 22, the internal combustion engine 21 drives air compressor 25 via a V belt 27 and an alternator 28 via a V belt 29. Compressed air from compressor 25 is coupled to the manhole via high-pressure hoses 12 and 13 as illustrated in FIG. 1. Current generated by the alternator 28 is applied to a distribution box 30 from where it is controllably supplied down the manhole via extension cable 15 as illustrated in FIG. 1.

The heat exchange fluid is circulated through the system by an engine driven water pump 31. The water pump is driven by a belt 32 and draws fluid from the heat exchanger 24 via condiut 33 through the air compressor 25 and conduit 34. The fluid is then forced through the block of the internal combustion engine 21 from which it exits via conduit 35 to flow through the exhaust heat exchanger and water cooled muffler assembly 26. The fluid leaves the exhaust heat exchanger and water cooled muffler via conduit 36 and returns to the heat exchanger 24.

Figure 3:
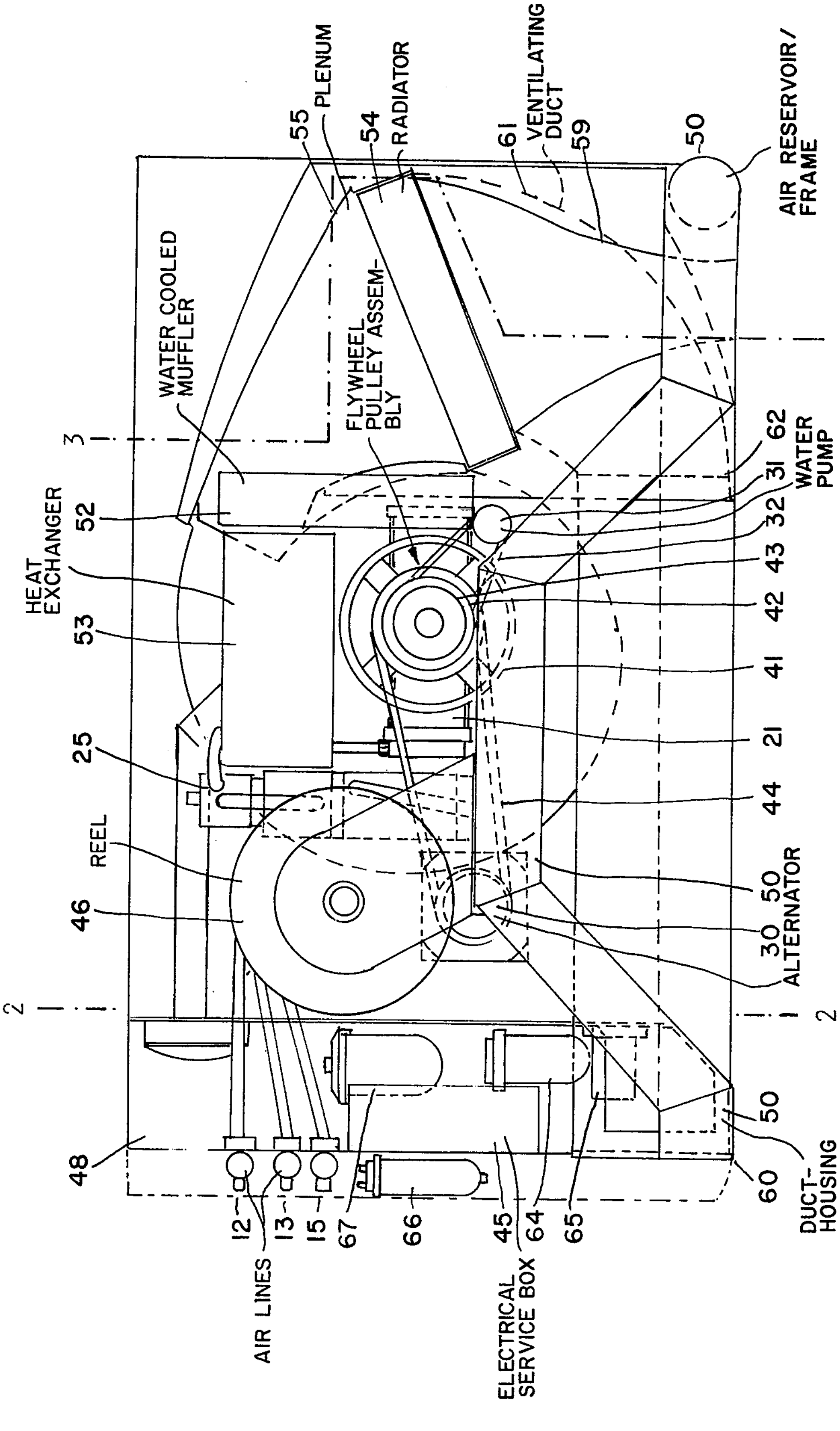
FIG. 3 is a right side view of the service module with the side panel removed.

FIG. 3 illustrates the right side of a preferred embodiment of the underground service module with the side panel removed to expose the primary elements of the system. The internal combustion engine 21 is located in the center of the unit. The crank shaft of the engine 21 incorporates power takeoff pulleys at both ends and the right side as illustrated in FIG. 3 supports the fly wheel 41, alternator drive pulley 42 and water pump drive pulley 43. The water pump 31 is positioned to the lower right of fly wheel 41 and coupled to pulley 43 by a V belt 32. The alternator 30 is positioned to the left of the engine and driven by V belt 44. The alternator is electrically connected to the electrical service box 45 which includes regulators, fuses, system controls and switches and circuit means whereby a battery for starting power for the engine may be charged and engine speed may be governed to ensure that alternating current of the proper voltage is supplied to cable 15 which is supported on reel 46. Reel 46 is free-wheeling so that electrical cable 15 and high-pressure air lines 12 and 13 may be deployed by pulling them from their receptacles on the front panel 48 of the underground service module. An electric motor 47 rewinds reel 46 to stow the high-pressure lines and the electrical cable. A five inch diameter, 14 gage steel duct 50 forms the primary frame of the underground service module. It is fabricated to form a pressure vessel which functions as a high-pressure air reservoir. This reduces the weight and size of the unit by eliminating the need for a high-pressure air tank. It further simplifies production of the unit because pressure vessels less than six inches in diameter do not require federal code requirements.

Exhaust gas from engine 21 passes through a water cooled muffler 52 and through an exhaust gas heat exchanger 53 wherein the majority of wasted heat of combustion is extracted and utilized to heat water flowing through radiator 54 positioned in plenum 55. The exhaust heat exchanger 53 and water cooled muffler 52 increase the temperature of the fluid which has been circulated through the water pump 25 and engine 21 so that additional heating means are not required to warm the air supplied by the ventilation system.

Figure 4:
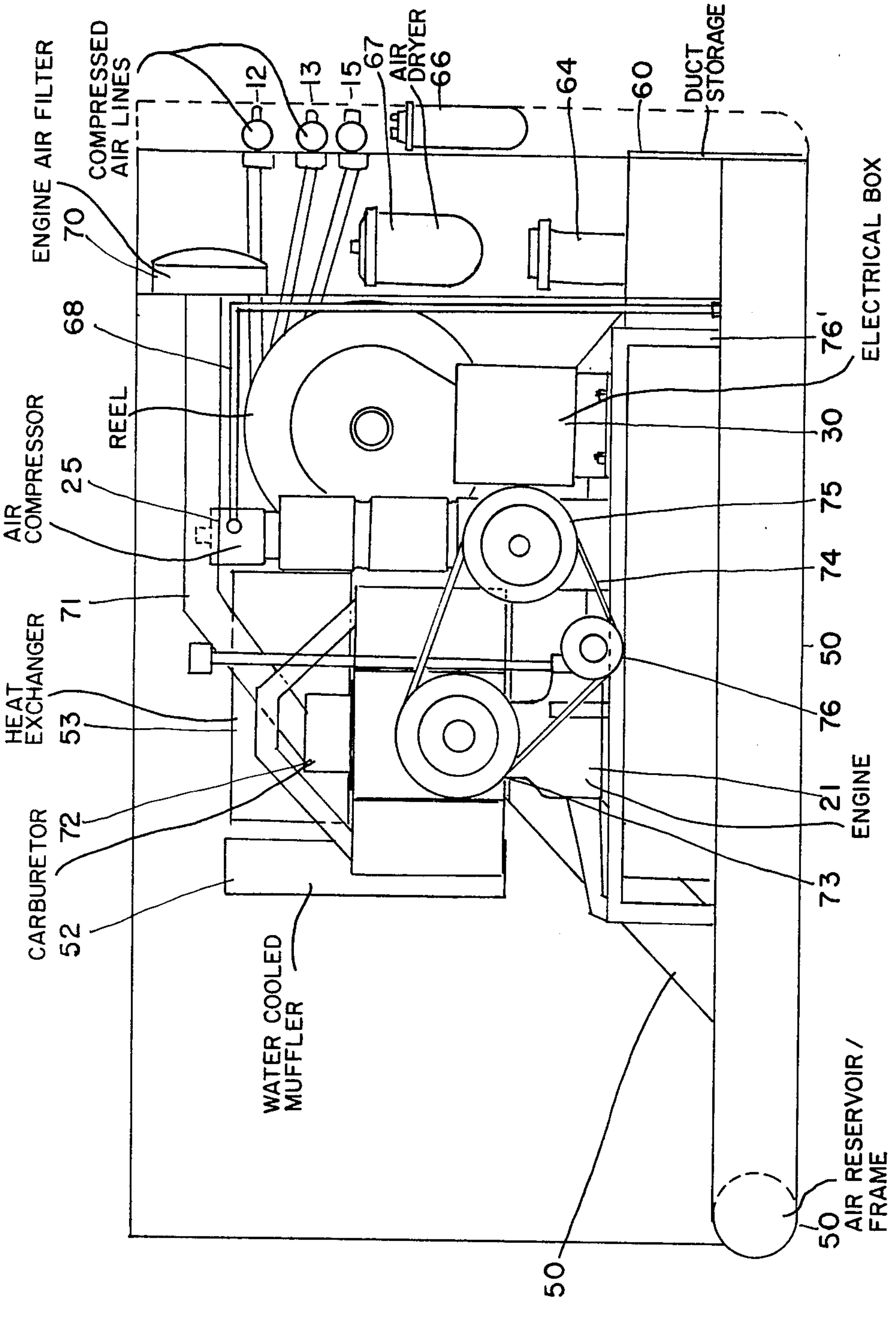
FIG. 4 is a left side view of the service module with the side panel removed.

A high capacity radial blower is connected to the left side of the internal combustion engine and positioned within the voluted plenum 55. The left side of the engine 21 is illustrated in FIG. 4 but the plenum 55 and radial blower wheel have been removed so that the air compressor drive system may be more readily viewed. Ventilating air is drawn from outside of the unit by the blower wheel and pressurized within the voluted plenum so no engine by-products, oil fumes, or exhaust gases can enter the system. In a preferred embodiment, the blower wheel and voluted plenum provide low-pressure ventilated air in an amount of from 400 to 750 cubic foot per minute. The exact amount of conditioned air provided by the system may be adjusted within that range by valve means in the blower intake 56 to FIG. 6.

Figure 6:
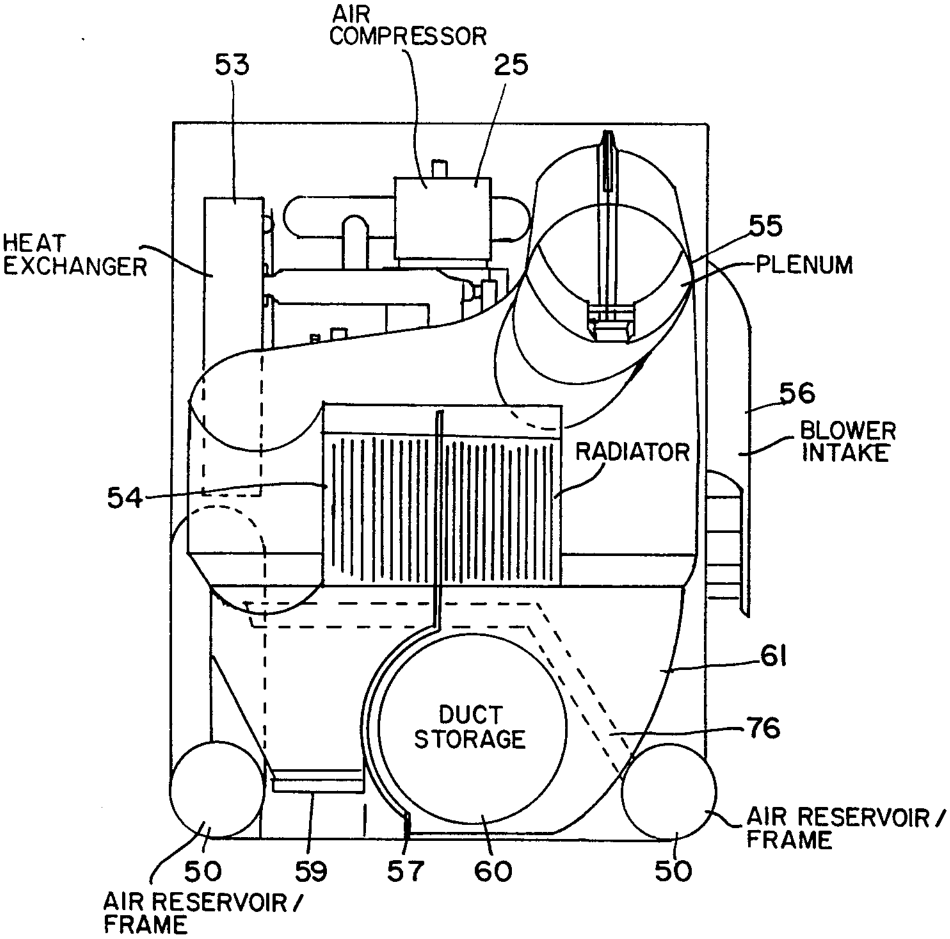
FIG. 6 is a sectional view through the plenum at the forward end of the module taken along 3—3 of FIG. 3.

The voluted plenum 55 is divided by a baffle 57 of FIG. 6 which causes air from the blower to be divided into two streams, one exiting at the bottom of the underground service module via conduit 59 of FIGS. 3 and 6 and the other which is coupled to the spiral duct tube 11 which is stored in housing 60.

The radiator 54 and baffle 57 may be best seen in FIG. 6 wherein the radiator is illustrated in a position half way between the ventilating duct 61 which couples the voluted duct 55 to the spiral tube duct 11 at coupling 62 located at the rear of storage tube 60. The interconnection of voluted duct 55 and ducts 59 and 60 form a track which supports the radiator 54 in a fashion which will permit the radiator to be slid across the interface between duct 55 and 61 so that air flowing to the spiral tube duct 11 will be heated by the radiator 54. The radiator may be slid to the left of baffle 57 so that air flowing into duct tube 11 will not be heated. When the radiator is in the extreme left position, the surplus air flowing from voluted duct 55 through duct 59 is heated and exhausted outside of the unit. This arrangement of splitting the air flow from voluted duct 55 is provided to ensure that air will always flow over the radiator 54 while the unit is in operation so that the engine and air compressor will be adequately cooled.

The water cooled air compressor system includes a compressed air filter 64, an oil filter 65, a lubricator 66 and a dryer 67 interconnected in a manner standard in the art to ensure that the compressed air provided by air compressor 25 is free of contaminates.

Figure 5:
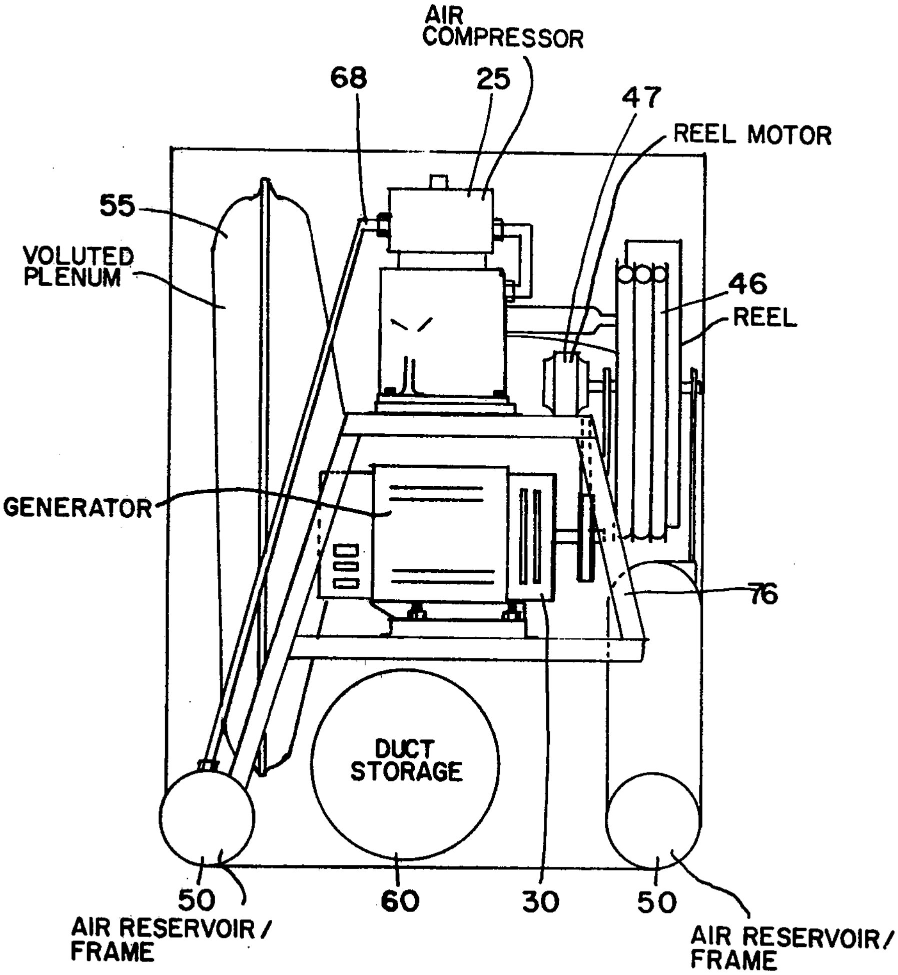
FIG. 5 is a sectional view taken behind the instrument bulkheads along 2—2 of FIG. 3.

High-pressure air produced by air compressor 25 is channeled from the air compressor to the frame storage tank 50 by conduit 68 of FIGS. 4 and 5. Before exiting the system via high-pressure hoses 12 and 13, the high-pressure air passes through the compressed air filter 64 and dryer 67. The air intake to the air compressor 25 is provided through filter 70 and carburetor input duct 71 which furnishes filtered air to both the air compressor and the carburetor 72 of the internal combustion engine 21.

FIG. 4 is a left side view of the underground service module with the side panel, duct work and blower wheel removed. As can be seen in this figure, the left side of the engine includes an output drive means 73. This drive means includes a means to couple the crankshaft directly to the blower and drive V belt 74. V belt 74 turns pulley 75 which drives the air compressor 25. A spring biased idler pulley 76 is included in the air compressor drive to ensure that proper belt tension is maintained.

All of the components of the underground service module are supported directly or indirectly on a frame comprised of hollow members 50 of FIGS. 3, 4, 5, and 6 which are interconnected to form a pressure vessel which acts as a reservoir for the air compressor. The primary elements of the system comprised of engine 21, air compressor 25 and alternator 30 are bolted to an angle iron framework, 76' of FIGS. 4, 5 and 6. This framework is welded to the tubing 50 which forms the basic structural frame.

While a preferred embodiment of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. A service module, comprising:
an internal combustion engine;
an air compressor driven by said internal combustion engine;
a framework for supporting said internal combustion engine and said air compressor wherein said framework is fabricated from tubular members interconnected to form a pressure vessel; and
means to couple high-pressure air from said air compressor to said framework pressure vessel.

2. A service module as defined in claim 1, further comprising:
a radial blower driven by said internal combustion engine for providing ventilating air.

3. A service module as defined in claim 2, further comprising:
an alternator driven by said internal combustion engine.

4. A service module, as defined in claim 1 wherein the internal combustion engine is liquid cooled; said air compressor is liquid cooled and driven by said internal combustion engine; and a ventilating blower driven by said internal combustion engine.

5. A service module as defined in claim 4, further comprising:
an alternator driven by said internal combustion engine.

6. A service module as defined in claim 4, comprising:
a heat exchange radiator;
fluid circuit means for interconnecting the cooling fluid for said internal combustion engine and said air compressor with said heat exchange radiator; and
said heat exchange radiator is positioned in said ventilation blower air stream.

7. A service module as defined in claim 6, further comprising:
an alternator driven by said internal combustion engine.

8. A service module as defined in claim 4, comprising:
a heat exchange radiator;
a fluid circuit for interconnecting the cooling fluid for said internal combustion engine and said air compressor with said heat exchange radiator;
said ventilation blower comprises, an impeller, a blower duct housing said impeller, a ventilating duct coupled to said blower duct, and an exhaust duct coupled to said blower duct whereby the air flow from said blower duct is divided between said ventilation duct and said exhaust duct; and
means to support said heat exchange radiator in the outlet of said blower duct so that said heat exchange radiator may be selectively positioned at the input to said ventilating duct or at the input to said exhaust duct.

9. A service module as defined in claim 8, further comprising:
an alternator driven by said internal combustion engine.

10. A service module as defined in claim 8, comprising:
a framework for supporting said internal combustion engine and said air compressor;

said framework comprised of tubing interconnected to form a pressure vessel; and means to connect said framework pressure vessel to said air compressor as a high-pressure air reservoir.

11. A service module as defined in claim 10, comprising:

an air hose coupled to said pressure vessel;

an electrical extension cable connected to said alternator;

a storage reel for said air hose and said electrical extension cable; and an electric motor for rewinding said storage reel.

* * * * *